United States Patent [19]

Hagan et al.

[11] Patent Number: 4,958,657

[45] Date of Patent: Sep. 25, 1990

[54] GAS SUPPLY SAFETY DEVICE

[75] Inventors: Thomas E. Hagan; John B. McGowan, Sr., both of Malvern, Pa.

[73] Assignee: Umac Incorporated, Exton, Pa.

[21] Appl. No.: 350,351

[22] Filed: May 11, 1989

[51] Int. Cl.$^5$ .............................................. F16K 17/30
[52] U.S. Cl. .................. 137/513.5; 137/517; 137/543.23
[58] Field of Search ............... 137/498, 517, 513.5, 137/504, 454.2, 543.23

[56] References Cited

U.S. PATENT DOCUMENTS

| | | |
|---|---|---|
| 163,255 | 5/1875 | Rehn . |
| 1,063,933 | 6/1913 | Keller . |
| 1,364,147 | 1/1921 | Spahr ........................... 137/454.2 X |
| 1,627,312 | 12/1925 | Blust . |
| 2,351,035 | 6/1944 | Grant, Jr. et al. . |
| 2,699,799 | 1/1955 | Wager ............................ 137/517 X |
| 2,771,091 | 11/1956 | Baker et al. ................... 137/454.2 X |
| 2,988,346 | 6/1961 | Sciore . |
| 3,111,138 | 11/1963 | Humphreys et al. ......... 137/513.5 X |
| 3,122,162 | 2/1964 | Sands . |
| 3,359,960 | 12/1967 | Pittsley . |
| 3,438,389 | 4/1969 | Lupin . |
| 3,635,254 | 1/1972 | Mitchell . |
| 3,918,481 | 11/1975 | Doe et al. ............................ 137/504 |
| 4,075,294 | 12/1978 | Saito et al. . |
| 4,257,443 | 3/1981 | Turney ......................... 137/454.2 X |
| 4,295,412 | 10/1981 | Hachiro ........................ 137/454.2 X |
| 4,319,604 | 3/1982 | Bird . |
| 4,510,993 | 4/1985 | Luetzelschwab . |
| 4,650,094 | 3/1987 | Werding . |

FOREIGN PATENT DOCUMENTS

| | | | |
|---|---|---|---|
| 106771 | 6/1984 | Japan ................................. 137/517 |
| 2116293 | 9/1983 | United Kingdom ............. 137/513.5 |

OTHER PUBLICATIONS

UMAC Brochure entitled: Donkin Flow Limitors Offer Service . . . Savings, Copyright 1979, UMAC.
Quality Fittings, Inc., Brochure entitled: Style 100, Anodeless Meter Riser Design Construction, distributed by UMA, Inc., PA.

Primary Examiner—Stephen M. Hepperle
Attorney, Agent, or Firm—Browdy and Neimark

[57] ABSTRACT

A safety flow limitor of modular construction for use in gas supply lines for passing a combustible natural gas from a source to a consumer comprises a cylindrical shell defining an internal passageway in which resides an axially movable valve head member having an annular surface for mating with an annular valve-seat provided along the passageway. A coil spring having its downstream portion retained in the passageway and its upstream portion abutting the valve head member serves to bias the annular surface of the valve head member away from the annular valve-seat so as to maintain the passageway open. If there is a pressure drop downstream, then the upstream pressure acts against the force of the coil spring and moves the valve head member to a downstream position where its annular surface mates with the annular valve-seat.

17 Claims, 2 Drawing Sheets

GAS SUPPLY SAFETY DEVICE

FIELD OF INVENTION

The present invention relates to the gas industry, and particularly to improvements in gas supply safety apparatus.

BACKGROUND

As pointed out in the Doe et al U.S. Pat. No. 3,918,481, there are circumstances in which faults develop in gas supply lines to commercial or domestic premises; under these circumstances it is of course highly desirable to limit the escape of gas through the fault. For example, if excavation work causes a major tear to develop in a gas supply line which would other otherwise allow a massive and dangerous quantity of gas to escape to the atmosphere, it is essential that the supply of gas upstream from the tear be immediately and automatically restricted. On the other hand, a complete shut-off of gas would make recommissioning of the repaired line difficult, and therefore it is desirable that the automatic shut-off means not completely cut off the flow of gas, but instead cut down the flow to only a very small and controlled amount.

The device of the aforementioned Doe et al U.S. Pat. No. 3,918,481 serves the aforementioned function very well. This prior device, known as the "Donkin ® Flow Limiter" has been sold and used in quantities of over six hundred thousand since 1984, without failure. It has served the industry very well and continues to serve the industry well to this day. Even so, the device of Doe et al U.S. patent does have some defects including a complex construction which makes manufacture costly and installation difficult, and certain performance shortcomings as explained below. Regarding its construction, its nonmodular form requires installation using special tools, and placement of the component parts relative to the compression of the spring is extremely critical and difficult in order to obtain optimum performance.

Regarding performance, the Doe et al flow limiter is not suitable for use in low pressure and/or high capacity, i.e. high flow rate, systems; and therefore the need exists for an improved flow limiter which has a "wider proportional band", i.e. a flow limiter which can handle a greater range of gas flow rates as well as high, normal and low pressure systems. There is a further demand for a flow limiter which is more sensitive, i.e. will trip under a lower pressure drop, thereby providing improved safety performance. Lastly, the Doe et al flow limiter has a complex construction including gaskets and washers, and therefore there is a demand for such a flow limiter which is simpler in construction and therefore less expensive to manufacture and install compared with the aforementioned Doe et al device.

Many valves and regulators exist in the prior art for carrying out a variety of functions relative to the flow therethrough of different kinds of fluids, liquid or gas. One example is shown in the Pittsley U.S. Pat. No. 3,359,960 which discloses a crankcase ventilation valve for controlling the flow of vapors from the crankcase to the induction system of an internal combustion engine. The Pittsley valve is intended and constructed to oscillate between the positions shown in FIGS. 2 and 3 based on rapidly changing differences in pressure between the engine crankcase and the induction system. As shown by the arrows in FIG. 2, the gas flow is from the passage 60, through the valve chamber 52, and then into and through the passage 66. As seen from FIG. 5, when the pressure drops downstream and that pressure drop is transferred through passage 66, there is initially an increase in the flow rate as the head 76 of the plunger 54 moves away from the seat 56, and then there is a gradual decrease in the flow rate as the pressure differential increases and as the plunger 54 enters the central passage 66 as shown in FIG. 3.

A number of other prior patents are of interest, including the Blust U.S. Pat. No. 1,627,312 which discloses an automatic safety cut-off for gas valves. Keller U.S. Pat. No. 1,063,933 shows a gas regulating valve. Sciore U.S. Pat. No. 2,988,346 shows a fuel regulating valve. Sands U.S. Pat. No. 3,122,162 discloses a flow control device. Werding U.S. Pat. No. 4,650,094 is directed to a thrust regulator. Luetzelschwab U.S. Pat. No. 4,510,993 discloses a flow controller. And the Saito et al U.S. Pat. No. 4,075,294 discloses a carburetor control valve.

In general and with few exceptions, it can be said that these prior devices are constructed for different environments and to provide different results. In gas regulator devices of the prior art, the gas flow direction is such that when there is a pressure drop downstream the valve opens to permit an increase flow of gas. In most prior art valves, the construction is such that when the valve is closed flow is stopped entirely.

SUMMARY OF INVENTION

It is, accordingly, an object of the invention to provide improvements in safety for gas supply systems.

It is another object of the present invention to overcome deficiencies in the prior art, such as indicated above.

It is a further object of the present invention to provide an improved flow limitor of modular construction, and especially an improved shut off device that trips to shut-off gas flow at a given pressure drop.

It is still another object of the present invention to provide an improved flow limiter which is particularly useful over a wide range of flow rates, and is consequently useful for high capacity usage where there is a large demand for natural gas.

It is still a further object of the present invention to provide an improved flow limiter which is more sensitive, i.e. trips to cut off gas flow under conditions of a lower pressure drop.

It is yet another object of the present invention to provide an improved flow limiter which is of simpler and less expensive construction.

It is yet a further object of the present invention to provide a variety of auxiliary gas handling constructions utilizing such an improved flow limiter having a modular construction, e.g. a meter riser unit, a combination automatic/manual turn off element for the upper end of a meter riser, and a pipe stiffener element embodying such a flow limiter.

These and other objects and the nature and advantages of the present invention will be more apparent from the following detailed description of certain specific embodiments, taken in conjunction with the drawing wherein:

DETAILED DESCRIPTION OF EMBODIMENTS

Figure 1:
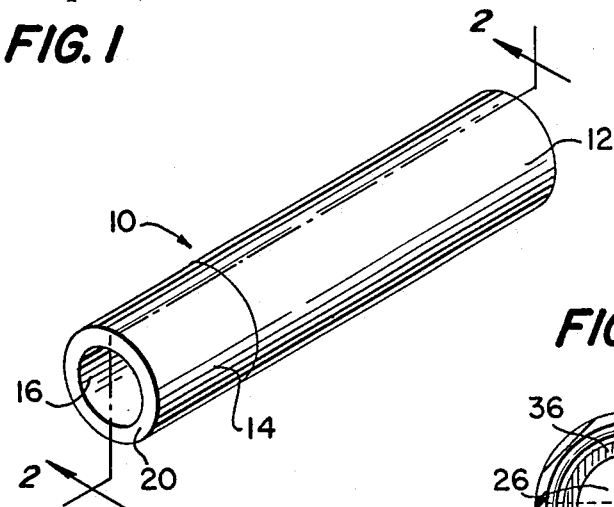
FIG. 1 is a perspective view of the outside of a flow limiter according to the present invention, showing its modular construction.
Figure 3:
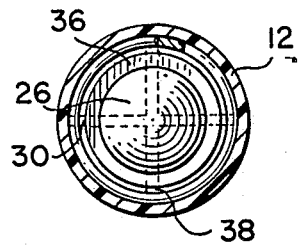
FIG. 3 is a radial sectional view taken along line 3—3 of FIG. 2.

FIG. 1 shows an embodiment of a flow limitor 10 in accordance with the present invention, in modular form, having a cylindrical shell initially composed of two pieces, namely an upstream piece 12 and a downstream piece 14, these two pieces being made integral after fabrication of the device. The shell pieces 12 and 14 are desirably molded of hard, strong plastic such as polyacetal (Delrin) or polycarbonate resin, although it will be understood that other materials can be used such as other thermoplastics including ABS interpolymer, high-impact polystyrene, polyamide, polyester, etc., curable resins such as epoxy resins, or even metal or ceramics. If the shells are formed of polyacetal as preferred or other thermoplastic polymers, and are symmetrical as shown and preferred, the two halves can be joined by spin welding after assembly.

As can be seen especially in FIG. 1, the outer surface of the shell is uniform and of consistent outer diameter for emplacement and fixing within a gas supply pipe as described below, such as by press fitting therewithin. The inner wall of the shell 12/14, on the other hand, defines an internal passageway 16 extending therethrough from an upstream end 18 to a downstream end 20, with a generally cylindrical cavity 22 along a part of the length thereof.

Disposed in the generally cylindrical cavity 22 is a valve head member 24 comprising a downstream nose portion 26 of generally conical configuration, a body portion 28 of generally cylindrical configuration upstream from the nose portion 26, and guiding fins 30, preferably of cruciform configuration, upstream from the cylindrical body portion 28 for centering the valve head 24 within the cylindrical cavity 22. The fins 30 desirably extend at least 25% of the length of the valve head member 24, and preferably about 35% in order to provide reliable guidance and stability. As with the shell 12/14, the valve head 22 may be formed of a variety of materials, but is preferably molded of a strong and resistant thermoplastic, most preferably polyacetal resin, the nose 26 and body 28 preferably being formed in one piece.

Figure 2:
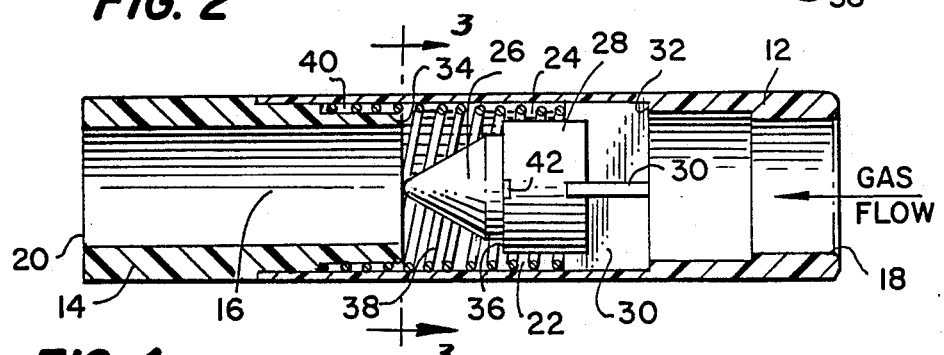
FIG. 2 is an axial sectional view taken along line 2—2 of FIG. 1.

Also as best seen in FIG. 2, the cylindrical cavity 22 is defined at its upstream end by an annular step 32 in the inner wall of the shell part 12, the annular step 32 defining a stop means for limiting axial upstream movement of the valve head member 24, i.e. in the position illustrated in FIG. 2, the upstream end edges of the fins 30 abut against the stop means 32. Similarly, downstream axial movement of the valve head member 24 is limited by an annular valve-seat 34 at the upstream end of the shell piece 14, the annular valve-seat 34 being located so as to mate with an annular surface 36 on the downstream side of the cylindrical body portion 28 of the head member 24.

Also as clearly seen in FIG. 2, a coil spring 38 is provided which biases the valve head member 24 in the upstream direction. The upstream end of the coil spring 38 is somewhat smaller in diameter than its downstream end so as to approach the outer diameter of the cylindrical body portion 28, and such upstream end of the coil spring abuts against the forward facing edges of the guiding fins 30. The downstream part of the coil spring 38 is retained in an annular cavity 40 formed between downstream end of the shell part 12 and the upstream end of the shell part 14.

As so far described above, the flow limitor 10, when installed in a combustible-gas supply line for passing a continuous or intermittent supply of natural or other consumer gas from a source to a combustible-gas user, will appropriately function if there is a break in the gas line downstream from the flow limitor 10, by completely shutting off flow. This will occur because, due to the break in the line downstream from the flow limitor 10, the upstream pressure will be well above atmospheric while the downstream pressure will be at atmospheric. This difference in pressure will exceed the strength of the coil spring 38 forcing the annular surface 36 to mate against the annular valve seat 34 shutting down further flow until the pressure on both sides of the flow limitor 10 is equalized or nearly equalized. Such a construction as so far described is suitable for certain uses of the flow limitor 10, including those discussed below relative to FIGS. 4, 5 and 7.

On the other hand, for most uses it is desirable, as already known from the aforementioned Doe et al U.S. Pat. No. 3,918,418, to provide a slight degree of leakage or bleeding-off even when the annular surface 36 is tightly seated against the annular valve-seat 34. The reason for providing this function is so that once the gas line is repaired downstream from the flow limitor 10, the bleed-by will automatically increase the pressure downstream so that the flow limitor will open automatically. There are a number of ways to achieve such a bleed-by function including providing a groove in the smooth outer wall of the shell 12/14 or providing a notch in the annular valve-seat 34; however, the preferred mechanism for accomplishing this function is to provide a notch 42 in the body portion 28 of the valve head member, such notch 42 extending into the annular surface 36 so that a leakage path is provided even when the flow limitor 10 is closed.

It will be understood that the flow limitor of the present invention is not a regulator, but is instead a shut-off device that trips to shut off glass flow at a given pressure drop downstream and at a consequent increased velocity flow through the passageway. The bleed-by feature, when present, serves to equalize pressure on both sides once the downstream piping has been repaired.

The present construction has certain functional improvements compared to the device of the aforementioned Doe et al U.S. Pat. No. 3,918,481, including its "wider proportional band", i.e. its ability to handle a wider range of flow rates. including what is commonly known in the art as "high capacity usage", i.e. delivery of gas to usage sites where there is a relatively large demand, e.g. apartments and condominiums. The present construction trips under a lower pressure drop on the order of 0.8–1.0 p.s.i. whereas the device of the aforementioned Doe U.S. patent requires a pressure drop of about 2.5–3 p.s.i., and this is an important additional safety feature.

Figure 6:
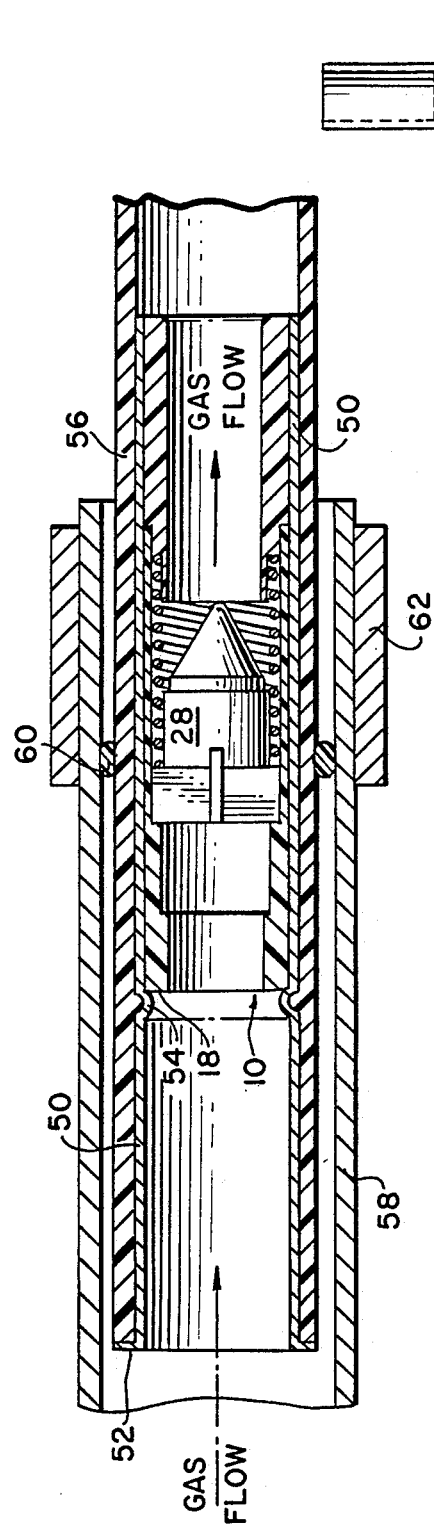
FIG. 6 is a sectional view of a modular flow limitor of the present invention installed within a pipe stiffener, used to couple a pair of pipes.

The flow limitor 10 with the notch 42 or other appropriate means to permit bleed-by flow of combustible gas past the flow limitor when the annular surface of the valve-head is in mating relationship with the annular valve-seat, is used in various locations of the gas supply line, and generally in the same manner as the aforementioned device of the Doe et al U.S. Pat. No. 3,918,481. Such a construction may also be used in the embodiment of FIG. 6 where the flow limitor 10, in its modular form, is incorporated within a typical pipe stiffener 50, having a flange 52 and an annular crimp 54. In this case the flow limitor lo may be inserted into the pipe stiffener 50 where its upstream end 18 abuts against the crimp 54. The flow limitor 10 may be press fitted within the pipe stiffener 50.

As is well known in the art, pipe stiffeners such as the pipe stiffener 50 are routinely used to couple plastic pipe, such as typical polyethylene pipe 56, to metal pipe 58. At least one gasket 60 is typically inserted between the metal pipe 58 and the polyethylene pipe 56 to prevent leakage. A standard compression coupling 62 is normally provided to more or less "crush" the end of the metal pipe 58 over the polyethylene pipe 56, and the metal pipe stiffener 50 is typically used to provide internal support for the polyethylene pipe 56 so as to prevent its collapse during the aforementioned coupling.

In accordance with the present invention, a flow limitor 10 according to the present invention can be used at each such coupling site, thereby providing an additional safety feature in case any leakage develops at the coupling site.

Figure 7:
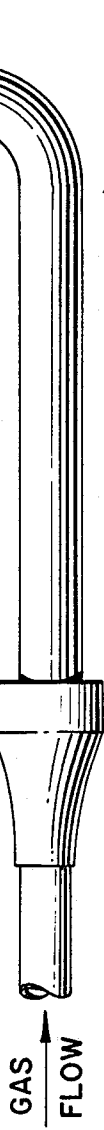
FIG. 7 is a view of a meter riser incorporating a flow limitor according to the present invention at its upper end.

FIG. 7 shows a further embodiment of use of the flow limitor of the present invention in a typical meter riser 70, the flow limitor 10 being placed at any position along the length of the meter riser, but preferably near the upper end of the vertical portion thereof, above ground level 72. For use in a meter riser, the flow limitor 10 may be provided with the bleed-by provision or not. Typically the meter riser leads to a meter and then to the customer. Where it is desired that the flow limitor 10 serve as a safety cut off valve without leakage to the customer, then the flow limitor 10 should not have the bleed-by feature. Similarly, where it is desired to enable the flow limitor 10 to function as both an automatic and a manual out-off valve, as is sometimes desirable in meter risers, again the bleed-by feature is not utilized.

Figure 4:
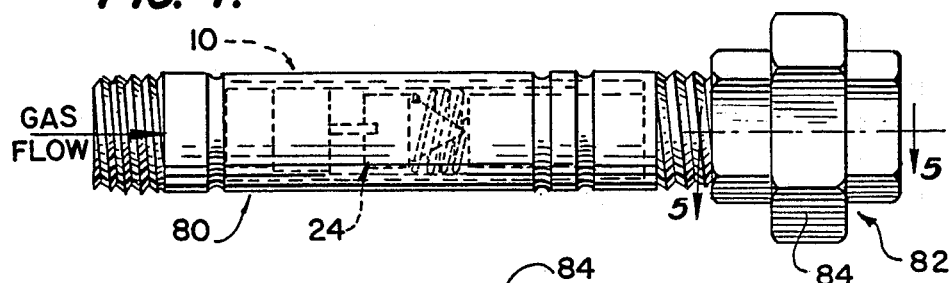
FIG. 4 is a view, partly in phantom, showing a modular flow limitor of the present invention installed in a pipe so as to function as an automatic/manual turn-off valve, such as at the top of a meter riser.
Figure 5:
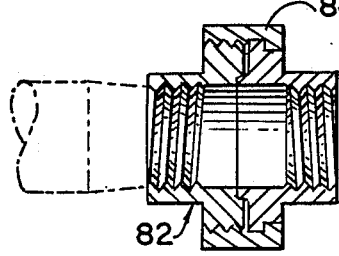
FIG. 5 is a sectional view taken along line 5—5 of FIG. 4.

The last mentioned situation exists in locations other than meter risers, and thus another use for the flow limitor 10 of the present invention is illustrated in FIGS. 4 and 5 which show a simple pipe coupling element 80 in which the flow limitor 10 is fixed, the pipe coupling element so having a simple slip joint pipe union 82 at one end thereof, same being well known per se. In this case the slip joint pipe union 82 constitutes an openable closure means downstream of the floW limitor 10. When the nut 84 is turned it will open a leak in the slip joint pipe union 82 which in turn will trip the flow limitor 10 to effect sealing of the pipe. In this site of usage, the flow limitor 10 can function either manually or automatically.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a combustible gas supply line for passing a continuous or intermittent supply of natural or other consumer gas from a source thereof to a combustible-gas user, comprising a gas supply pipe having opposite ends and a safety flow limitor spaced along said pipe, the improvement wherein said safety flow limitor has a modular construction comprising:

a cylindrical shell having a generally uniform outer wall surface of consistent outer diameter, said gas supply pipe being unitary and having an inner diameter substantially equal to the outer diameter of said shell, and said shell being fixed within said unitary gas supply pipe between the ends thereof;

said cylindrical shell having an internal wall surface defining an internal passageway extending axially therethrough, and an annular valve-seat along said passageway;

a valve head member positioned within said passageway and capable of axial movement between said valve-seat and an upstream position, and said valve head having an annular surface for mating with said annular valve-seat, a body portion extending upstream from said annular surface, and guiding fin means upstream from said body portion for radially centering said valve head within said passageway; and a coil spring for biasing said valve head toward said upstream position and away from said valve seat;

wherein said unitary gas supply pipe comprises a meter riser.

2. In a combustible gas supply line for passing a continuous or intermittent supply of natural or other consumer gas from a source thereof to a combustible-gas user, comprising a gas supply pipe having opposite ends and a safety flow limitor spaced along said pipe, the improvement wherein said safety flow limitor has a modular construction comprising:

a cylindrical shell having a generally uniform outer wall surface of consistent outer diameter, said gas supply pipe being unitary and having an inner diameter substantially equal to the outer diameter of said shell, and said shell being fixed within said unitary gas supply pipe between the ends thereof;

said cylindrical shell having an internal wall surface defining an internal passageway extending axially therethrough, and an annular valve-seat along said passageway;

a valve head member positioned within said passageway and capable of axial movement between said valve-seat and an upstream position, and said valve head having an annular surface for mating with said annular valve-seat, a body portion extending upstream from said annular surface, and guiding fin means upstream from said body portion for radially centering said valve head within said passageway; and a coil spring for biasing said valve head toward said upstream position and away from said valve seat;

wherein said unitary gas supply pipe has an openable closure means downstream of said flow limitor for manually stopping gas flow through said pipe by opening said closure to effect sealing of said annular surface against said annular valve-seat.

3. In a combustible gas supply line for passing a continuous or intermittent supply of natural or other consumer gas from a source thereof to a combustible-gas user, comprising a gas supply pipe having opposite ends and a safety flow limitor spaced along said pipe, the improvement wherein said safety flow limitor has a modular construction comprising:

a cylindrical shell having a generally uniform outer wall surface of consistent outer diameter, said gas supply pipe being unitary and having an inner diameter substantially equal to the outer diameter of said shell, and said shell being fixed within said unitary gas supply pipe between the ends thereof;

said cylindrical shell having an internal wall surface defining an internal passageway extending axially therethrough, and an annular valve-seat along said passageway;

a valve head member positioned within said passageway and capable of axial movement between said valve-seat and an upstream position, and said valve head having an annular surface for mating with said annular valve-seat, a body portion extending upstream from said annular surface, and guiding fin means upstream from said body portion for radially centering said valve head within said passageway;

a coil spring for biasing said valve head toward said upstream position and away from said valve seat; and means to permit bleed-by flow of combustible gas past said flow limitor when said annular surface of said valve head is in mating relationship with said annular valve-seat.

4. A supply line according to claim 3 wherein said unitary gas supply pipe comprises a pipe stiffener.

5. A safety flow limitor of modular construction for use in gas supply lines for passing a combustible natural or other consumer gas from a source thereof to a consumer comprising:

a cylindrical shell having a generally uniform outer wall surface of consistent outer diameter and an internal wall surface defining an internal passageway extending axially therethrough from an upstream end to a downstream end;

an axially movable valve head member disposed in a cylindrical cavity defined by said internal wall surface along said passageway, said internal wall surface further defining an annular valve-seat at a downstream end of said cavity and a head member stop means at an upstream end of said cylindrical cavity for limiting axial upstream movement of said valve head member;

said valve head member comprising a downstream nose portion, a body portion upstream from said nose portion, said body portion carrying an annular surface for mating with said annular valve-seat, and guiding fin means upstream from said body portion for centering said valve head within said cylindrical cavity;

coil spring means for biasing said valve head toward said stop means and away from said annular valve-seat, and means to permit bleed-by flow of combustible gas past said flow limitor when said annular surface of said valve is in mating relationship with said annular valve-seat.

6. A safety flow limitor in accordance with claim 5 wherein said shell is initially formed of two axially symmetrical thermoplastic pieces.

7. A safety flow limitor in accordance with claim 8 wherein said two pieces are spin welded together.

8. A safety floW limitor according to claim 5 wherein said cylindrical shell is molded of plastic, and said nose portion and said body portion of said valve head member are molded in one piece of thermoplastic material.

9. A safety flow limitor according to claim 5 wherein said head member stop means comprises an annular step along said internal wall surface defining said passageway.

10. A safety flow limitor in accordance with claim 5 wherein said means to permit bleed-by flow of combustible gas comprises a notch in said annular surface.

11. A safety flow limitor in accordance with claim 5 wherein said guiding fin means comprises a plurality of axially extending fins formed in a cruciform pattern.

12. A safety flow limitor in accordance with claim 5 wherein said body portion of said valve head member is substantially circular-cylindrical, and said annular surface is located on a front face of said cylindrical body portion.

13. A safety flow limitor in accordance with claim 12 wherein said nose portion is of generally conical configuration and extends downstream from said front face of said body portion.

14. A safety flow limitor in accordance with claim 5 wherein said internal wall surface further defines an annular cavity, and wherein a downstream end portion of said coil spring means is retained in said annular cavity.

15. A safety flow limitor according to claim 5 wherein said cylindrical shell is initially formed of two pieces which interfit to define an annular cavity along said passageway, a downstream portion of said coil spring means resting in said annular cavity.

16. A safety flow limitor in accordance with claim 5 wherein said guiding fin means comprises a plurality of fins which extends radially outwardly from a central axis and further extend axially a distance equal to at least 25% of the total length of said valve head member.

17. A safety flow limitor according to claim 5 wherein said guiding fin means comprises a plurality of fins, and an upstream end of said coil spring means rests against downstream edges of said plurality of fins.

* * * * *